(12) United States Patent
Niemiec et al.

(10) Patent No.: US 11,625,922 B2
(45) Date of Patent: Apr. 11, 2023

(54) EVENT SUMMARIZATION FACILITATED BY EMOTIONS/REACTIONS OF PEOPLE NEAR AN EVENT LOCATION

(71) Applicant: MOTOROLA SOLUTIONS, INC., Chicago, IL (US)

(72) Inventors: Pawel Niemiec, Rzeszow (PL); Rafal Faber, Przeginia Duchowna (PL); Pawel Jurzak, Cracow (PL); Grzegorz Kaplita, Rzeszow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/194,752

(22) Filed: Mar. 8, 2021

(65) Prior Publication Data
US 2022/0284219 A1 Sep. 8, 2022

(51) Int. Cl.
| | |
|---|---|
| *G06F 16/732* | (2019.01) |
| *G06F 16/738* | (2019.01) |
| *G06F 16/783* | (2019.01) |
| *G06F 16/71* | (2019.01) |
| *G06V 20/40* | (2022.01) |
| *G06V 40/16* | (2022.01) |
| *G06N 20/00* | (2019.01) |

(52) U.S. Cl.
CPC ............ *G06V 20/47* (2022.01); *G06F 16/71* (2019.01); *G06F 16/732* (2019.01); *G06F 16/739* (2019.01); *G06F 16/7837* (2019.01); *G06V 40/174* (2022.01); *G06N 20/00* (2019.01)

(58) Field of Classification Search
CPC .. G06F 16/732; G06F 16/7837; G06F 16/739; G06F 16/71; G06N 20/00; G06V 40/174; G06V 20/47
See application file for complete search history.

(56) References Cited

U.S. PATENT DOCUMENTS

| | | | |
|---|---|---|---|
| 9,961,403 B2 | 5/2018 | Kritt et al. | |
| 2013/0246448 A1* | 9/2013 | Sa | G06F 16/954 |
| | | | 707/E17.014 |
| 2014/0172848 A1* | 6/2014 | Koukoumidis | G06F 16/78 |
| | | | 707/736 |
| 2016/0191995 A1 | 6/2016 | Kaliouby et al. | |
| 2017/0178476 A1* | 6/2017 | Jeon | G08B 13/19656 |

(Continued)

FOREIGN PATENT DOCUMENTS

EP         3182276 A1    6/2017

OTHER PUBLICATIONS

B. Xu, Y. Fu, Y. Jiang, B. Li and L. Sigal, "Heterogeneous Knowledge Transfer in Video Emotion Recognition, Attribution and Summarization," in IEEE Transactions on Affective Computing, vol. 9, No. 2, pp. 255-270, Apr. 1-Jun. 2018, doi: 10.1109/TAFFC.2016.2622690.

(Continued)

*Primary Examiner* — Richard L Bowen (57) ABSTRACT

A method, system and computer program product for event summarization facilitated by emotions/reactions of people near an event location is disclosed. The method includes generating a query based at least in part on reaction information and at least in part on primary video metadata. Based on the query, at least one possible event summarization match for the one or more events is retrieved from a database.

20 Claims, 3 Drawing Sheets

(56) References Cited

U.S. PATENT DOCUMENTS

| | | | |
|---|---|---|---|
| 2017/0319123 A1* | 11/2017 | Voss | A61B 5/6803 |
| 2018/0020091 A1* | 1/2018 | Self | H04M 3/5116 |
| 2018/0048935 A1* | 2/2018 | Ashoori | H04N 21/23418 |
| 2019/0026367 A1* | 1/2019 | Boss | G06F 16/7844 |
| 2019/0164555 A1* | 5/2019 | Chen | G10L 15/26 |
| 2020/0225963 A1* | 7/2020 | Noh | G06F 9/451 |

OTHER PUBLICATIONS

B. Xu, Y. Zheng, H. Ye, C. Wu, H. Wang and G. Sun, "Video Emotion Recognition with Concept Selection," 2019 IEEE International Conference on Multimedia and Expo (ICME), Shanghai, China, 2019, pp. 406-411, doi: 10.1109/ICME.2019.00077.

Nandigam, Nageswara Rao: "MDRED: Multi-Modal Multi-Task Distributed Recognition for Event Detection", a Thesis in Computer Science, Presented to the Faculty of the University of Missouri—Kansas City in Partial Fulfillment of the Requirements for the Degree, Master of Science, Kansas City, Missouri, 2018, URL: https://hdl.handle.net/10355/65995, all pages.

L. Li and Li Fei-Fei, "What, where and who? Classifying events by scene and object recognition," 2007 IEEE 11th International Conference on Computer Vision, Rio de Janeiro, 2007, pp. 1 8, doi: 10.1109/ICCV 2007.4408872.

* cited by examiner

EVENT SUMMARIZATION FACILITATED BY EMOTIONS/REACTIONS OF PEOPLE NEAR AN EVENT LOCATION

BACKGROUND

With the increasing prevalence of video cameras in modern day society, often a potentially important event is captured on video. Emotions of people shown within the captured video can help provide information that furthers an understanding of the event. Sometimes however faces of people are not clearly visible within the captured video, or perhaps the faces are visible, but for whatever reason the expressions on the faces do not convey sufficient emotion or reaction information. This can be problematic. For example, say a dog and a man are running around outside, and the dog is chasing the man, jumping whenever it gets close. Without any information about the facial expression of the man in the scene, it may not be possible to accurately summarize the event, because a terrified facial expression may mean that the dog is attacking the man, whereas a smiling/laughing facial expression may mean the dog and the man are engaging in playful exercise.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a computer-implemented method that includes receiving, at an at least one processor: primary video metadata that describes objects present within primary video data depicting one or more events; and secondary metadata corresponding to secondary data correlated to the one or more events. The secondary metadata provides reaction information that includes one or more of emotion information and other behavior-specific information. The computer-implemented method also includes generating a query based at least in part on the reaction information and at least in part on the primary video metadata. Based on the query, at least one possible event summarization match for the one or more events is retrieved from a database. The computer-implemented method also includes storing the possible event summarization match together with the primary video metadata when the possible event summarization match is confirmed as a correct event summarization.

According to another example embodiment, there is provided a multimedia system that includes at least one camera configured to capture primary video data depicting one or more events. The multimedia system also includes a server system communicatively coupled to the at least one camera. The server system includes at least one processor and an at least one storage device. The at least one processor is configured to generate, or receive from the at least one storage device, primary video metadata that describes objects present within the primary video data. The at least one processor is further configured to receive secondary metadata corresponding to secondary data correlated to the one or more events. The secondary metadata provides reaction information that includes one or more of emotion information and other behavior-specific information. The at least one processor is further configured to process a query, that is based at least in part on the reaction information and at least in part on the primary video metadata, to retrieve, from a database residing on the at least one storage device, at least one possible event summarization match for the one or more events. When the possible event summarization match is confirmed as a correct event summarization, the possible event summarization match is stored together with the primary video metadata on the at least one storage device.

In some implementations, the at least one camera (within a multimedia system in accordance with an example embodiment) is owned by a single entity or a group of related entities, and the secondary data is second one or more additional video data captured by additional one or more cameras owned by one or more entities unrelated to the single entity or the group of related entities.

Each of the above-mentioned embodiments will be discussed in more detail below, starting with example system and device architectures of the system in which the embodiments may be practiced, followed by an illustration of processing blocks for achieving an improved technical method, system and computer program product for event summarization facilitated by emotions/reactions of people near an event location. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include humans, vehicles, animals, etc.

Further advantages and features consistent with this disclosure will be set forth in the following detailed description, with reference to the figures.

Figure 1:
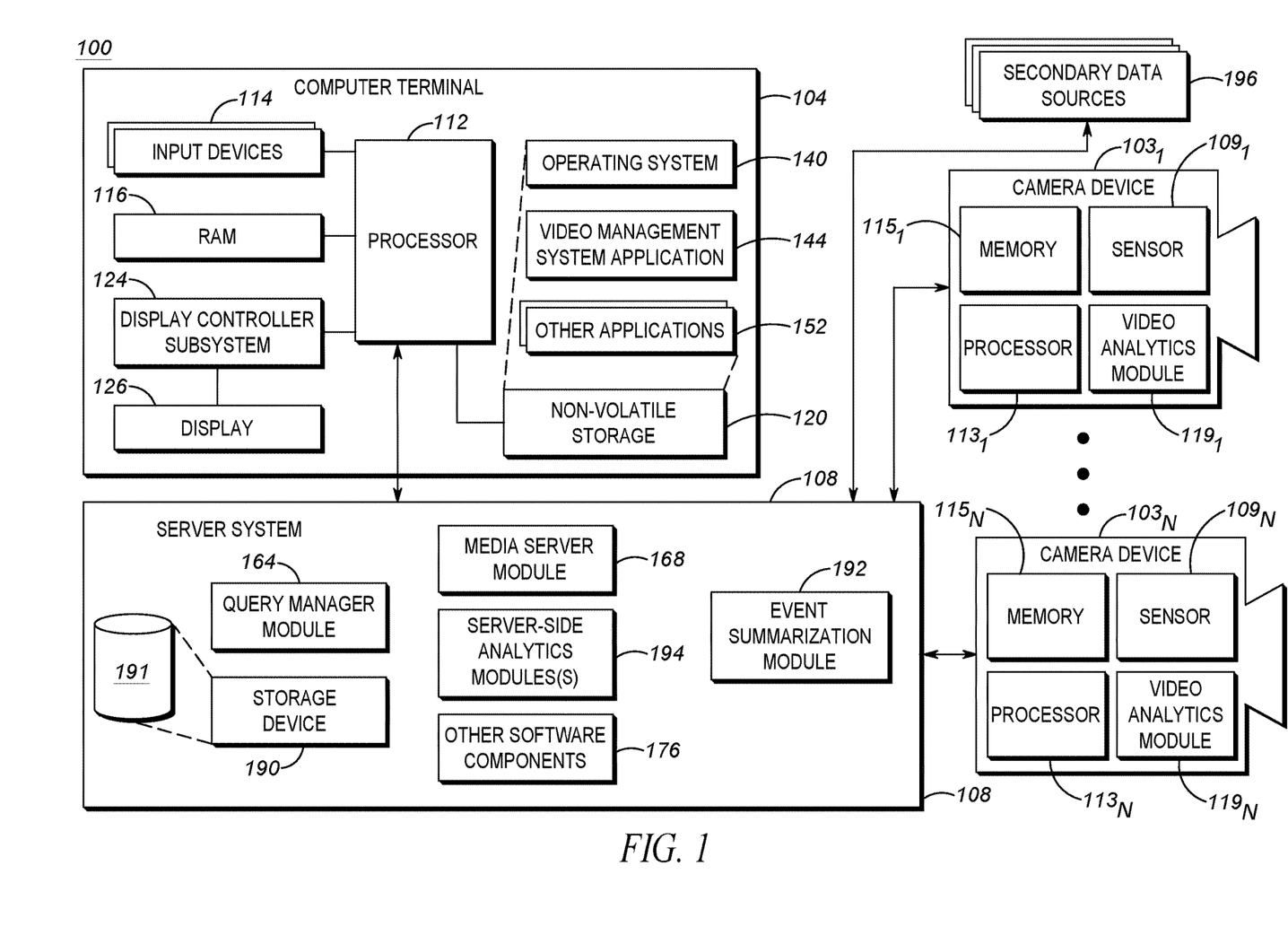
FIG. 1 is a block diagram of a multimedia system in accordance with example embodiments.

Referring now to the drawings, and in particular FIG. 1 which is a block diagram of an example multimedia system 100 within which methods in accordance with example embodiments can be carried out. Included within the illustrated multimedia system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems. The display controller subsystem 124 interacts with display 126 and it renders graphics and/or text upon the display 126.

Still with reference to the computer terminal 104 of the multimedia system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, Video Management System (VMS) application 144, and other applications 152, or parts thereof, may be temporarily loaded into a volatile store such as the RAM 116. The processor 112, in addition to its operating system functions, can enable execution of the various software applications on the computer terminal 104.

Regarding the VMS application 144, this can be run on the computer terminal 104 and may include a search User Interface (UI) module for cooperation with a search session manager module in order to enable a computer terminal user to carry out actions related to providing input in relation images, live video and video recordings (such as, for example, input to facilitate annotating or selectively exporting, to incident report folders, video footage captured by a plurality of video security cameras). Also, regarding the aforementioned search session manager module, this provides a communications interface between the search UI module and a query manager module 164 of the server system 108. In at least some examples, the search session manager module communicates with the query manager module 164 through the use of Remote Procedure Calls (RPCs). The query manager module 164 receives and processes queries originating from the computer terminal 104, which may facilitate retrieval and delivery of various sorts of data and metadata as herein later described in more detail. In this regard, the query manager module 164 is communicatively coupled to an at least one storage device 190 (described later herein in more detail). The query manager module 164 is also communicatively coupled to an event summarization module 192 (also described subsequently herein in more detail) that may take the form of, for example, computer program instructions that run on one or more processors of the server system 108.

Referring once again to FIG. 1, the server system 108 includes several software components (besides the query manager module 164 already described) for carrying out other functions of the server system 108. For example, the server system 108 includes a media server module 168. The media server module 168 handles client requests related to storage and retrieval of security video taken by camera devices $103_1$-$103_n$ in the multimedia system 100. In some examples, the media server module 168 may carry out other functions in relation to other forms of media communicated to the computer terminal 104 from the server system 108. The server system 108 also includes server-side analytics module(s) 194 which can include, in some examples, any suitable one of known commercially available software that carry out computer vision related functions (complementary to any video analytics performed in the cameras) as understood by a person of skill in the art. The server-side analytics module(s) 194 can also include software for carrying out non-video analytics, such as audio analytics that may, for example, convert spoken words into text, carry out audio emotion recognition, etc.

The server system 108 also includes a number of other software components 176. These other software components will vary depending on the requirements of the server system 108 within the overall system. As just one example, the other software components 176 might include special test and debugging software, or software to facilitate version updating of modules within the server system 108.

Regarding the at least one storage device 190, this comprises, for example, one or more databases 191 which may facilitate the organized storing of recorded security video, non-video sensor data, etcetera in accordance with example embodiments. The one or more databases 191 may also contain metadata related to, for example, the recorded security video that is storable within one or more storages. The one or more databases 191 may also contain other types of metadata besides video metadata. Examples of metadata other than video metadata, that may be stored in the one or more databases 191, include audio metadata, GPS location metadata, etcetera.

The illustrated multimedia system 100 includes a plurality of camera devices 103$_1$-103$_n$ (hereinafter interchangeably referred to as "cameras 103$_1$-103$_n$" when referring to all of the illustrated cameras, or "camera 103" when referring to any individual one of the plurality) being operable to capture a plurality of images and produce image data representing the plurality of captured images. The camera 103 is an image capturing device and includes security video cameras. Furthermore, it will be understood that the multimedia system 100 includes any suitable number of cameras (i.e. n is any suitable integer greater than one).

The camera 103 includes an image sensor 109 for capturing a plurality of images. The camera 103 may be a digital video camera and the image sensor 109 may output captured light as a digital data. For example, the image sensor 109 may be a CMOS, NMOS, or Charge-Couple Device (CCD). In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the multimedia system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared and/or ultraviolet range. In other examples, the camera 103 may have similarities to a "multi-sensor" type of camera, such that the camera 103 includes pairs of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a pan-tilt-zoom camera, dome camera, in-ceiling camera, box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, physical access control device, video game console or controller.

The camera 103 includes one or more processors 113, one or more video analytics modules 119, and one or more memory devices 115 coupled to the processors and one or more network interfaces. Regarding the video analytics module 119, this generates metadata outputted to the server system 108. The metadata can include, for example, records which describe various detections of objects such as, for instance, pixel locations for the detected object in respect of a first record and a last record for the camera within which the respective metadata is being generated.

Also, it is contemplated that the camera 103 may have different operational modes, and that the operation mode may change (for example, via a command) in response to an event. For instance, operation of the camera 103 may change from a first mode associated with normal operation, to a second mode where the camera 103 operates to more comprehensively capture emotions or reactions of persons within a field of view of the camera 103.

Regarding the memory device 115 within the camera 103, this can include a local memory (such as, for example, a random access memory and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store in memory (including store in volatile memory, non-volatile memory, dynamic memory, etc. or any combination thereof).

Continuing with FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN). In some examples, the camera 103 may be coupled to the server system 108 in a more direct manner than as described above.

The illustrated multimedia system 100 includes one or more secondary data sources 196. The secondary data sources 196 may include storage devices that store various types of secondary data as described in more detail subsequently herein. In some example, the secondary data sources may be in the cloud and/or located in third party systems, auxiliary systems, etc.

In some examples, the secondary data sources 196 are coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the secondary data sources 196 and the server system 108 can be any number of known arrangements, examples of which were previously herein detailed. In at least one example embodiment, the secondary data sources 196 and the server system 108 are within the same Local Area Network (LAN). In some examples, the secondary data sources 196 may be coupled to the server system 108 in a more direct manner than as described above.

Figure 2:
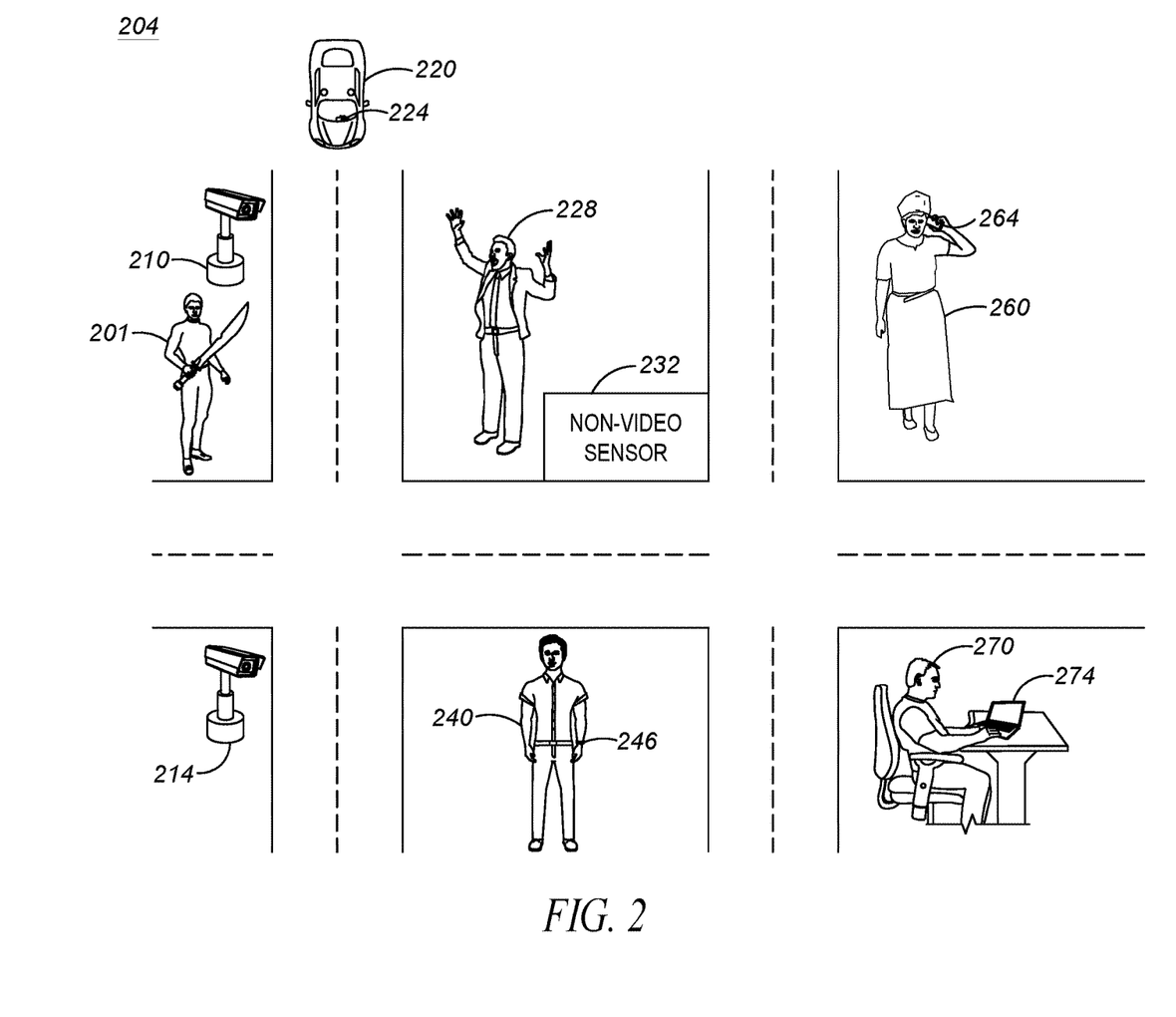
FIG. 2 is a schematic diagram of a practical implementation, in accordance with example embodiments, of the system of FIG. 1.

Reference is now made to FIG. 2. FIG. 2 is a schematic diagram of a practical implementation, in accordance with example embodiments, of the system of FIG. 1. In the illustrated example implementation, an apparently mentally disturbed person 201 is moving around on foot within a geographic area 204 wielding a sword. Also within the geographic area 204 are two stationary security cameras 210 and 214 (although two security cameras are shown for convenience of illustration, any suitable number and of video cameras is contemplated). The security cameras 210 and 214 (each of which may be similar or the same as the camera 103 shown in FIG. 1) are communicatively connected to the server 108 (FIG. 1) as previously herein described. The security cameras 210 and 214 capture primary video (stored as primary video data) with the person 201 being depicted within the primary video.

Examples of the secondary data sources 196 are also shown within FIG. 1. For example, a car 220 (perhaps belonging to a private citizen) to which is attached a dash camera 224 captures video (i.e. video which supplements the previously mentioned primary video captured by the security cameras 210 and 214). More specifically, it may be that the video captured by the dash camera 224 depicts a screaming person 228 because the car 220 drives by in the vicinity of that person. Video analytics carried out on the face of the screaming person 228 appearing in such supplemental video may determine that the emotion being experienced by the screaming person 228 is terror (obtained emotion information will vary and may include, for example, smiling facial expression, terrified facial expression, terrified composure of a person, etcetera). Accordingly this captured video constitutes a type of secondary data as herein contemplated, and it may be stored together along with the corresponding video metadata outputted from the video analytics in persistent storage which may perhaps be within the car 220, but more likely at another location not within the car 220.

Continuing on, a non-video sensor 232 may capture additional secondary data. For instance, the non-video sensor 232 may be, for example, a microphone or an acoustic sensor for part of a public safety system (for example, the ShotSpotter™ system sold by Shotspotter, Inc). In such case, example audio data captured by the non-video sensor 232 may include, for example, screaming and perhaps words such as: "There is a man running around and trying to swing a sword at people!" The captured audio data may be processed to generate corresponding audio metadata which may be stored in persistent storage (at the location of the non-video sensor 232 or at a different location) along with the audio data. The audio metadata is another contemplated type of secondary metadata from which at a later point in time reaction information (including one or more of emotion information and other behavior-specific information) may be obtained.

Next and still with reference to FIG. 2, also shown within the geographic area 204 is a man 240, wearing a watch 246, who is running away from the location of the person 201. The pulse of the man 240 is elevated so that a biometric sensor within the watch 246 records biometric data (another form of secondary data) corresponding to the elevated pulse. The biometric data may be processed to generate corresponding biometric metadata which may be stored in persistent storage along with the biometric data (stored within the watch 246 or wirelessly transmitted from the watch 246 to a remotely located storage such as, for example, cloud storage). The biometric metadata is another contemplated type of secondary metadata from which at a later point in time reaction information may be obtained.

Continuing on, also shown in FIG. 2 is a woman 260, holding a mobile phone 264 (which is an example of a human-operated communication device) and the woman 260 is on an emergency (i.e. 911) phone call. The phone call may be received and recorded at an emergency call processing center (which may also be able to record a Global Positioning System location for the mobile phone 264). Recorded words from the phone call (audio data) may include, for example: "People around me are running around trying to flee from something going on near here!" The recorded audio data may be processed to generate corresponding audio metadata which may be stored in persistent storage (at the call processing center, for example) along with the audio data. Also, the Global Positioning System location may be stored as part of the metadata. The obtained metadata is another contemplated type of secondary metadata from which at a later point in time reaction information (including one or more of emotion information and other behavior-specific information) may be obtained.

Alternatives to the above described audio call via the mobile phone 264 are contemplated. For example, some areas and jurisdictions support so-called text-to-911 service which allows people to send text messages to an emergency/911 processing center. This text data received at the emergency/911 processing center may be processed to derive emotion information in relation to person(s) (for example, the woman 260) observing something in relation to the event.

Continuing on, also shown in FIG. 2 is a man 270 operating a laptop computer 274. The man 270 may be composing and posting written details relating to the event (i.e. concerning the sword-wielding person 201) to a social media site, and such written details may constitute another source of secondary data (amongst the other sources of secondary data herein described) and which may be subsequently analyzed to obtain reaction information (including one or more of emotion information and other behavior-specific information) stored as secondary metadata corresponding to the posted written details on a persistent storage along with the posted written details scraped from the social media site.

Figure 3:
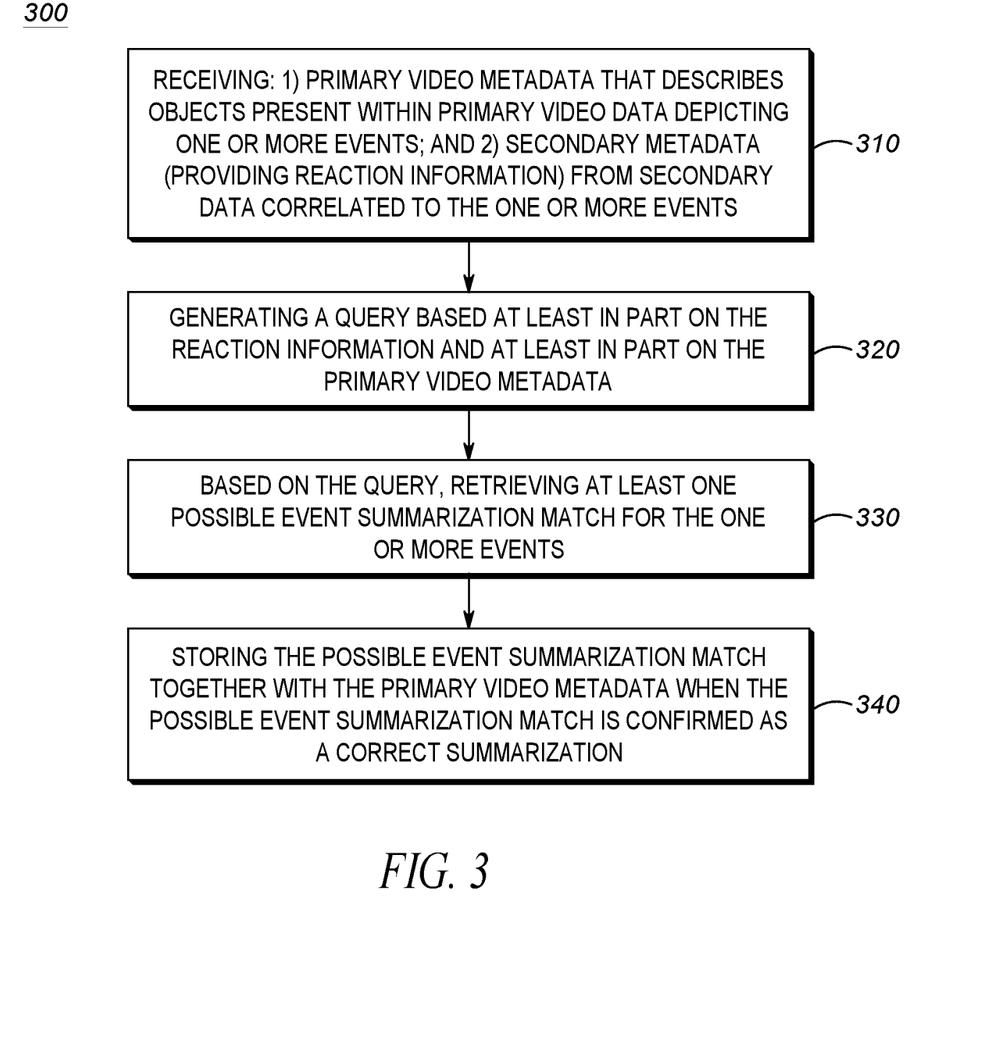
FIG. 3 is a flow chart illustrating an event summarization method in accordance with an example embodiment.

FIG. 3 is a flow chart illustrating a method 300 of event summarization in accordance with an example embodiment. The illustrated method 300 includes receiving (310) i) primary video metadata that describes objects present within primary video data depicting one or more events; and ii) secondary metadata (providing reaction information that includes one or more of emotion information and other behavior-specific information) from secondary data correlated to the one or more events. For example, the server system 108 may receive primary video metadata from one or more of the camera devices $103_1$-$103_n$ and secondary metadata from one or more of the secondary data sources 196.

Next the method 300 includes generating (320) a query based at least in part on the reaction information and at least in part on the primary video metadata. For instance, in some examples a query may originate from the computer terminal 104, and be initiated by interaction of a user with one or more input devices 114 of the computer terminal 104.

Next the method 300 includes retrieving (330) (based on the query) from a database (for example, the database 191 on the server system 108 interfaced via the query manager module 164) at least one possible event summarization match for the one or more events.

Next the method 300 includes storing (340) the possible event summarization match together with the primary video metadata when the possible event summarization match is confirmed as a correct event summarization. For instance, the possible event summarization match together with the primary video metadata may be stored in the database 191 on the server system 108. In some examples, the carrying out of determining whether a possible event summarization is a correct match (or not a match) may include Artificial Intelligence (AI)-based processing by the event summarization module 192. For instance, the event summarization module 192 may include neural network(s) or some other machine learning implementation that is trained to recognize a match (for example, based on a confidence score exceeding a threshold). The more specific details of such suitable AI will vary based on the selective preference of the skilled person, and are not further herein discussed so as not to obscure the disclosure with details that will be readily apparent to those of ordinary skill in the art having the benefit of the description herein provided.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and cannot systematically extract relevant reaction information from a plurality of secondary data sources to enable retrieval of a correct summarization for corresponding primary video, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
    receiving, at an at least one processor:
        primary video metadata that describes objects present within primary video data depicting one or more events having commenced within a geographic area of an emergency; and
        secondary metadata corresponding to secondary data correlated to the one or more events, wherein the secondary metadata provides reaction information corresponding to an at least one person different than any of the described objects of the primary video metadata, and the reaction information including one or more of emotion information and other behavior-specific information;
    generating a query based at least in part on the reaction information and at least in part on the primary video metadata;
    based on the query, retrieving, from a database, at least one possible event summarization match for the one or more events; and
    storing the possible event summarization match together with the primary video metadata when the possible event summarization match is confirmed as a correct event summarization.

2. The computer-implemented method as claimed in claim 1 further comprising employing a machine learning module to confirm that the possible event summarization match is the correct event summarization based on further video metadata.

3. The computer-implemented method as claimed in claim 1 wherein the at least one possible event summarization match is a plurality of possible event summarization matches including at least one incorrect event summarization.

4. The computer-implemented method as claimed in claim 3 further comprising employing a machine learning module to confirm that:
    a first possible event summarization match of the plurality of possible event summarization matches is the correct event summarization; and a second possible event summarization match of the plurality of possible event summarization matches is the incorrect event summarization.

5. The computer-implemented method as claimed in claim 1 wherein the primary video data is first one or more video recordings captured by first one or more cameras owned by a single entity or a group of related entities, and the secondary data is second one or more additional video data captured by second one or more cameras owned by one or more entities unrelated to the single entity or the group of related entities.

6. The computer-implemented method as claimed in claim 5 wherein:
the reaction information includes the emotion information that is derived from an output of a video analytics module; and
the video analytics module detects emotions of objects present within second one or more video recordings.

7. The computer-implemented method as claimed in claim 1 wherein the at least one person is cataloged as having observed the one or more events.

8. The computer-implemented method as claimed in claim 1 wherein the secondary data is an audio recording, a text transcript of a phone call, a text-to-911 message, location-tagged social media data, or text recorded in a talk group related to the one or more events.

9. The computer-implemented method as claimed in claim 1 wherein the secondary data is non-video sensor data from one or more Internet of things devices.

10. The computer-implemented method as claimed in claim 1 wherein artificial intelligence is employed to confirm the possible event summarization as the correct event summarization.

11. The computer-implemented method as claimed in claim 1 wherein the primary video data is first one or more video recordings captured by first one or more cameras within the geographic area of the emergency, and the secondary data is one or more audio recordings made at a different location near the geographic area of the emergency.

12. The computer-implemented method as claimed in claim 1 further comprising:
receiving, at the least one processor, confirmation input from a user; and
confirming the possible event summarization match is the correct event summarization based on the confirmation input.

13. The computer-implemented method as claimed in claim 1 wherein the reaction information includes the emotion information that includes at least one smiling facial expression, at least one terrified facial expression, or at least one terrified composure of the at least one person.

14. The computer-implemented method as claimed in claim 1 wherein the other behavior-specific information is an indicator that at least one human-operated communication device proximate the one or more events initiated an emergency call.

15. A multimedia system comprising:
at least one camera configured to capture primary video data depicting one or more events having commenced within a geographic area of an emergency;
a server system communicatively coupled to the at least one camera, and the server system including at least one processor and an at least one storage device, and the at least one processor configured to:
generate, or receive from the at least one storage device, primary video metadata that describes objects present within the primary video data; and
receive secondary metadata corresponding to secondary data correlated to the one or more events, wherein the secondary metadata provides reaction information corresponding to an at least one person, and the reaction information including one or more of emotion information and other behavior-specific information; and
process a query, that is based at least in part on the reaction information and at least in part on the primary video metadata, to retrieve, from a database residing on the at least one storage device, at least one possible event summarization match for the one or more events, and
wherein when the possible event summarization match is confirmed, without involvement of the at least one person, as a correct event summarization, and the possible event summarization match is stored together with the primary video metadata on the at least one storage device.

16. The multimedia system as claimed in claim 15 wherein the server system is configured to transmit a command to the at least one camera to change operation of the at least one camera from a first mode associated with normal operation, to a second mode where the at least one camera operates to more comprehensively capture emotions or reactions of persons within a field of view of the at least one camera.

17. The multimedia system as claimed in claim 15 wherein the at least one camera is owned by a single entity or a group of related entities, and the secondary data is second one or more additional video data captured by additional one or more cameras owned by one or more entities unrelated to the single entity or the group of related entities.

18. The multimedia system as claimed in claim 15 wherein the reaction information includes the emotion information that includes at least one smiling facial expression, at least one terrified facial expression, or at least one terrified composure of the at least one person.

19. The multimedia system as claimed in claim 15 wherein the other behavior-specific information is an indicator that at least one human-operated communication device proximate the one or more events initiated an emergency call.

20. The computer-implemented method as claimed in claim 1 wherein the at least one person is someone that has observed, contemporaneously responsive to actual event occurrence, the one or more events.

* * * * *